US006985719B2

(12) United States Patent
Leppinen et al.

(10) Patent No.: US 6,985,719 B2
(45) Date of Patent: Jan. 10, 2006

(54) SECURE WIRELESS BACKUP MECHANISM

(75) Inventors: Mika Leppinen, Woburn, MA (US); Sachin Padma, Woburn, MA (US); Anil Y. Reddy, Malden, MA (US)

(73) Assignee: Nokia, Inc., Irving, TX (US)

(*) Notice: Subject to any disclaimer, the term of this patent is extended or adjusted under 35 U.S.C. 154(b) by 556 days.

(21) Appl. No.: 09/740,960

(22) Filed: Dec. 21, 2000

(65) Prior Publication Data

US 2002/0081995 A1 Jun. 27, 2002

(51) Int. Cl.
H04M 11/10 (2006.01)

(52) U.S. Cl. .................. 455/412.1; 455/514; 380/270
(58) Field of Classification Search ............. 455/412.1, 455/418–419, 410, 514, 554.2, 412.2, 414.1, 455/466, 556.1; 380/239, 270; 707/202, 204; 709/217–219, 247

See application file for complete search history.

(56) References Cited

U.S. PATENT DOCUMENTS

| 6,064,880 | A  | * | 5/2000  | Alanara ................. 455/419 |
| 6,230,082 | B1 | * | 5/2001  | Harada et al. ............. 701/1 |
| 6,363,249 | B1 | * | 3/2002  | Nordeman et al. ........ 455/418 |
| 6,414,146 | B1 | * | 7/2002  | Takeyama et al. ........ 544/221 |
| 6,421,673 | B1 | * | 7/2002  | Caldwell et al. ........... 707/10 |
| 6,445,932 | B1 | * | 9/2002  | Soini et al. ............. 455/556 |
| 6,496,949 | B1 | * | 12/2002 | Kanevsky et al. .......... 714/47 |
| 6,539,461 | B2 | * | 3/2003  | Suzuki et al. ............ 711/162 |
| 6,549,773 | B1 | * | 4/2003  | Linden et al. .......... 455/426.1 |
| 6,574,733 | B1 | * | 6/2003  | Langford ................ 713/194 |
| 6,625,447 | B1 | * | 9/2003  | Rossmann ............. 455/426.1 |
| 6,714,952 | B2 | * | 3/2004  | Dunham et al. ........... 707/204 |

FOREIGN PATENT DOCUMENTS

| EP | 1158511 A2 | * | 11/2001 |
| GB | 2342817 A  |   | 4/2000  |
| GB | 2358556 A  | * | 7/2001  |

OTHER PUBLICATIONS

International Search Report.
SYNCML Consortium: "SynML Sync Protocol, version 1.0", SYNCML Specification Online!, Dec. 7, 2000, pp. 1–60.
Leavitt: "Will Wap Deliver The Wireless Internet?", Computer, IEEE Computer Society, vol. 33, No. 5, May 2000, pp. 16–20.
SYNCML Corporation: "SynML Representation Protocol, version 1.0", SYNCML Specification, Online!, Dec. 7, 2000 Dec. 2000, pp. 1–104.
Wireless Application Forum: "Wireless Application Protocol. Wireless Transport Layer Security Specification", Wireless Application Protocol Specification, Online!, Feb. 11, 1999, pp. 1–89.

* cited by examiner

Primary Examiner—William Trost
Assistant Examiner—Brandon J. Miller
(74) Attorney, Agent, or Firm—Banner & Witcoff, Ltd.

(57) ABSTRACT

A convenient way for securely storing sensitive data in a public storage area over a wireless network is disclosed. Data that is to be backed up is encrypted using a public key of the user and is sent over the wireless network using a Wireless Application Protocol (WAP) technique and preferably contained within the body of a SyncML document or an XML document. The encrypted data can be later retrieved using a WAP technique and decrypted using the private key of the user.

29 Claims, 3 Drawing Sheets

SECURE WIRELESS BACKUP MECHANISM

BACKGROUND OF THE INVENTION

1. Field of the Invention

The present invention relates to wireless systems and secure backup. More particularly, the present invention relates to a method and system for securely storing data in a public storage area over a wireless network.

2. Description of the Related Art

Mobile client devices, such as mobile telephone handsets, personal digital assistants (PDAs) and wireless computing devices, will have an ever increasing role in the future for accessing and securely storing sensitive data, whether personal or system data, in a public storage area over a wireless network.

FIG. 1 shows a functional block diagram of a wireless terminal 100 that provides a conventional secure backup over a wireless network. Wireless terminal 100 includes a memory 101 for storing data and a backup/restore module 102. In the situation when data, such as personal data and/or system data, is to be encrypted by a user, the user specifies data that is to be encrypted and then supplies the user's public encryption key to backup/restore module 102. Backup/restore module 102 accesses the specified data in memory 101 and encrypts the specified data using the user's public key. The encrypted data is sent to, for example, a public storage area 103 over a wireless network 104 in a well-known manner. The encrypted data can only be decrypted using the user's private key. When the user desires to access the stored encrypted data, the encrypted data is downloaded from storage area 103 and decrypted by backup/restore module 102 using the user's private key in a well-known manner.

Nevertheless, what is needed is a convenient way for securely storing sensitive data in a public storage area over a wireless network. Additionally, what is needed is a way to conveniently share sensitive data among different users.

SUMMARY OF THE INVENTION

The present invention provides a convenient way for securely storing sensitive data in a public storage area over a wireless network. The present invention also provides a way to conveniently share sensitive data among different users. In that regard, the present invention provides a technique for securely backing-up data over a wireless network and then later retrieving the securely backed-up data. The data that is to be backed up is encrypted using a public key of the user and is sent over the wireless network, preferably contained within the body of a synchronization message, such as a SyncML document or an XML document. The encrypted data can be later retrieved and decrypted using the private key of the user. Privacy of the encrypted data is protected as long as the private key of the user has not been compromised.

The advantages of the present invention are provided by a method and a system for backing-up data in a wireless network. According to the invention, data is selected within a wireless device, such as a wireless telephone handset or a personal digital assistant, for backup in a storage area that is accessible by the wireless device through the wireless network. The selected data is encrypted using a private key, and then sent to the public storage area preferably using a Wireless Application Protocol (WAP) technique and preferably encapsulated within a SyncML document or an XML document. The encrypted data can later be downloaded from the public storage area preferably using a WAP technique, and the encrypted data is decrypted using a private key.

BRIEF DESCRIPTION OF THE DRAWINGS

The present invention is illustrated by way of example and not limitation in the accompanying figures in which like reference numerals indicate similar elements and in which.

DETAILED DESCRIPTION

The present invention provides a technique for securely storing sensitive data in a public storage area from a client wireless terminal over a wireless network. The data that is to be backed up is encrypted using a public key and is sent over the wireless network using a Wireless Application Protocol (WAP) technique and preferably contained within the body of a SyncML document or an XML document. The encrypted data can be later retrieved and decrypted using the private key of the user.

Figure 1:
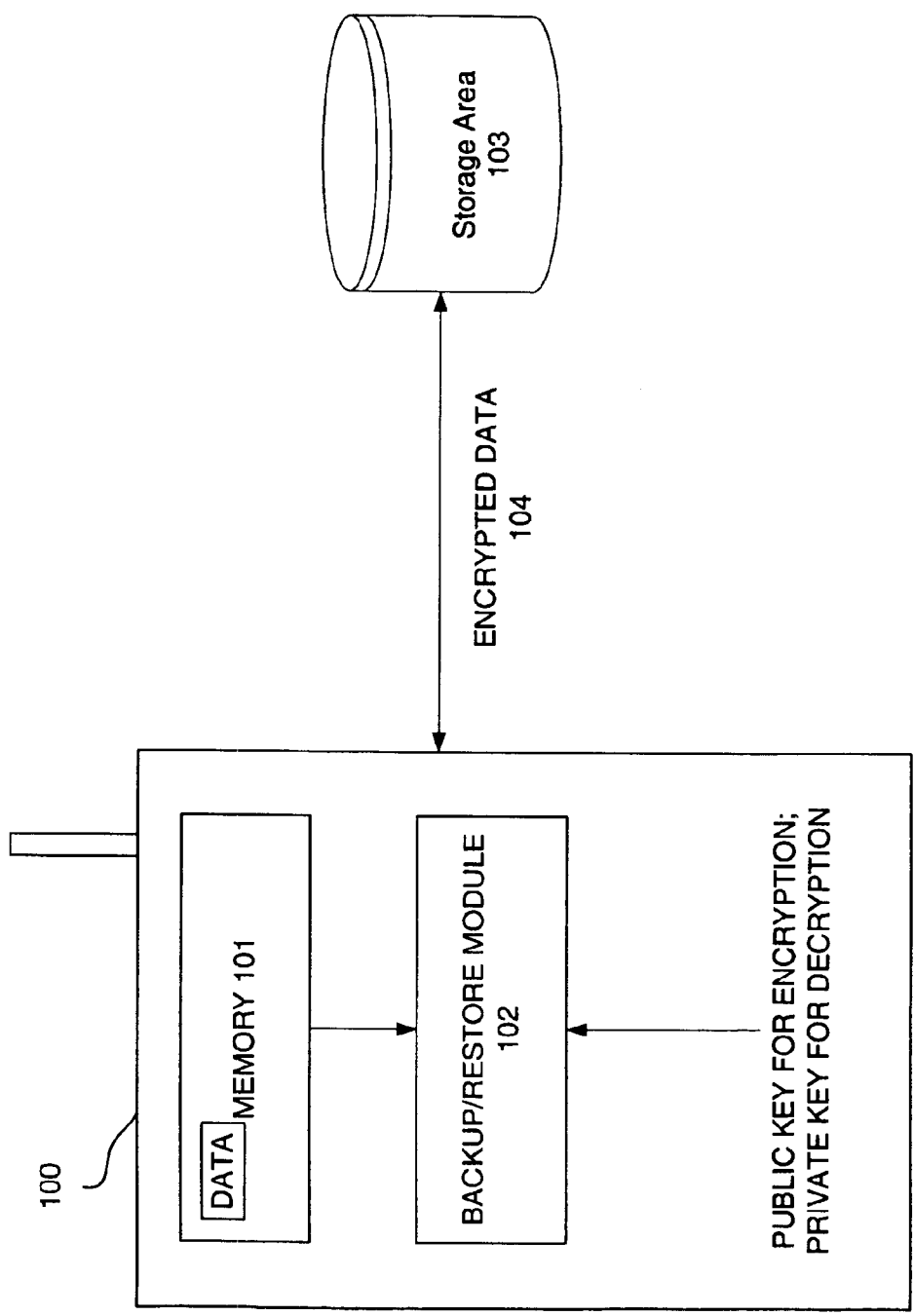
FIG. 1 shows a functional block diagram of a wireless terminal that provides secure backup over a wireless network.
Figure 2:
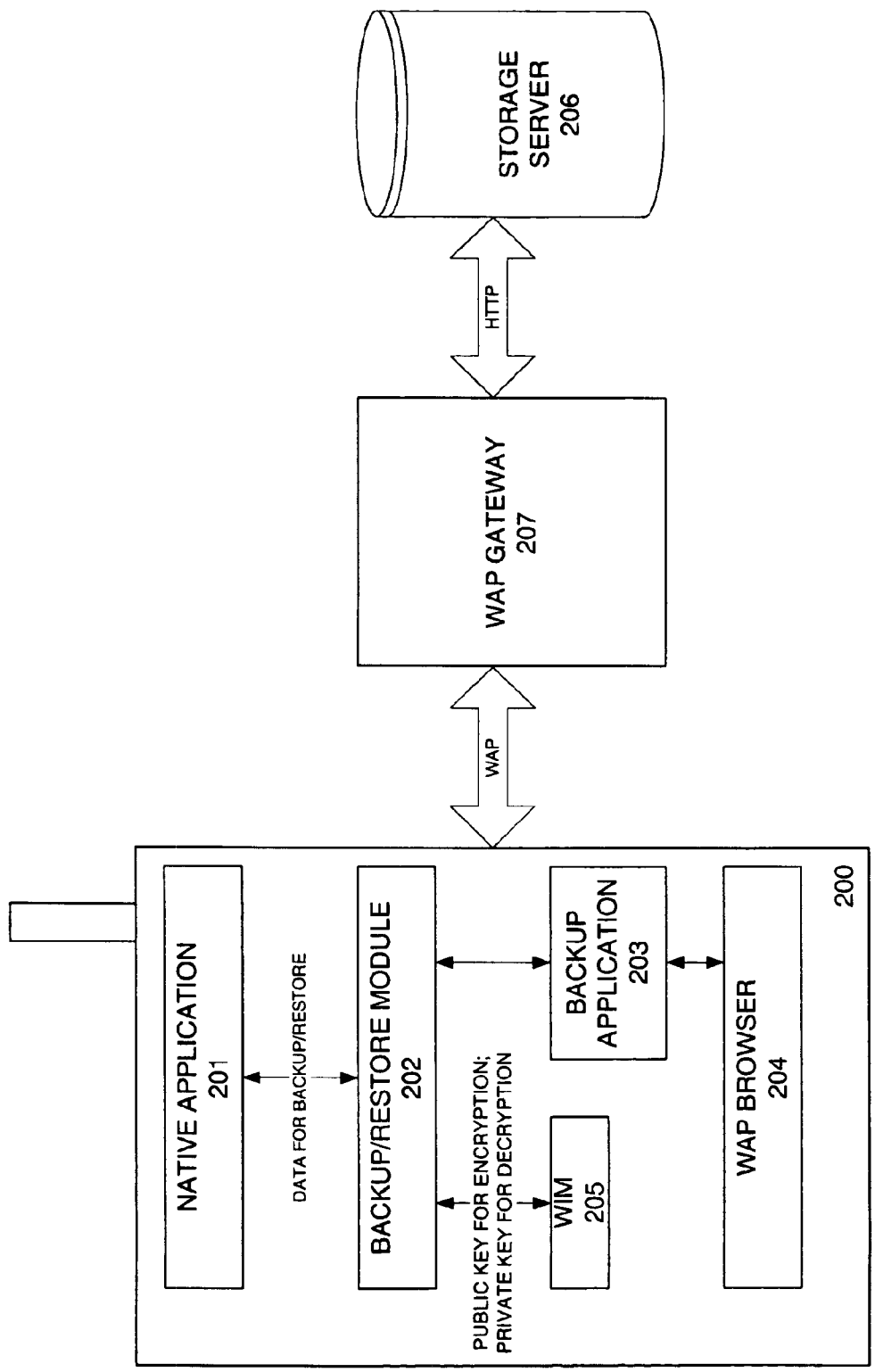
FIG. 2 shows a functional block diagram of a wireless terminal that provides secure backup over a wireless network according to the present invention.

FIG. 2 shows a functional block diagram of a wireless terminal or computing device 200, such as a wireless handset or a personal digital assistant (PDA), that provides secure backup over a wireless network according to the present invention. Wireless terminal 200 includes a native application 201, a backup/restore module 202, a backup application 203 and a Wireless Application Protocol (WAP) browser 204. According to one variation of the invention, wireless terminal 200 operates as a WAP client device and uses a Wireless Identity Module (WIM) 205 that is preferably tamper-resistant so that the keys, the certificate and the certification standard that are stored within WIM are not easily compromised.

When a user desires to store data within native application 201, such as personal data and/or system data, in a public storage area 206, the user can select the desired data through WAP browser 204 by interacting with backup application 203. Native application 201 then sends the desired data for encryption and backup to backup/restore module 202. WIM 205 provides the user's public key to backup/restore module 202 for encrypting the selected data using, for example, a conventional public key encryption algorithm. The encrypted data is then sent to public storage area 206 through a WAP gateway 207. That is, wireless terminal 200 encapsulates the encrypted data in the body of a SyncML document or XML document and sends the encapsulated, encrypted data to WAP gateway 207 through backup application 203 using the WAP protocol. WAP gateway 207 forwards the encapsulated encrypted data to public storage area 206 using, for example, the HTTP protocol. The particular public storage area selected by the user is specified by the user and is contained in user configuration data or operator setup data within wireless terminal 200.

Encrypted data that is stored in public storage area 206 can be accessed by using WAP browser 204 through backup application 203, and is preferably identified by a Uniform Resource Identifier (URI). To restore encrypted data, WAP browser 204 downloads the desired encrypted data using the WAP protocol and sends the downloaded data to backup/restore module 202 for decryption. The user's private key is supplied to backup/restore module 202 by WIM 205. Once decrypted, the data is sent to native application 201 for restoration.

WIM 205 allows that a user can securely store data from one wireless terminal device and securely access the stored data from another wireless terminal device. That is, WIM 205 stores the certification standard, and the keys and the certificate that are unique to a particular user. Thus, a user can encrypt sensitive data on one wireless terminal device for storage in a public storage area using the user's WIM. The user can then access the encrypted data stored in the public storage area from another wireless terminal device as long as the user uses the same WIM.

Figure 3:
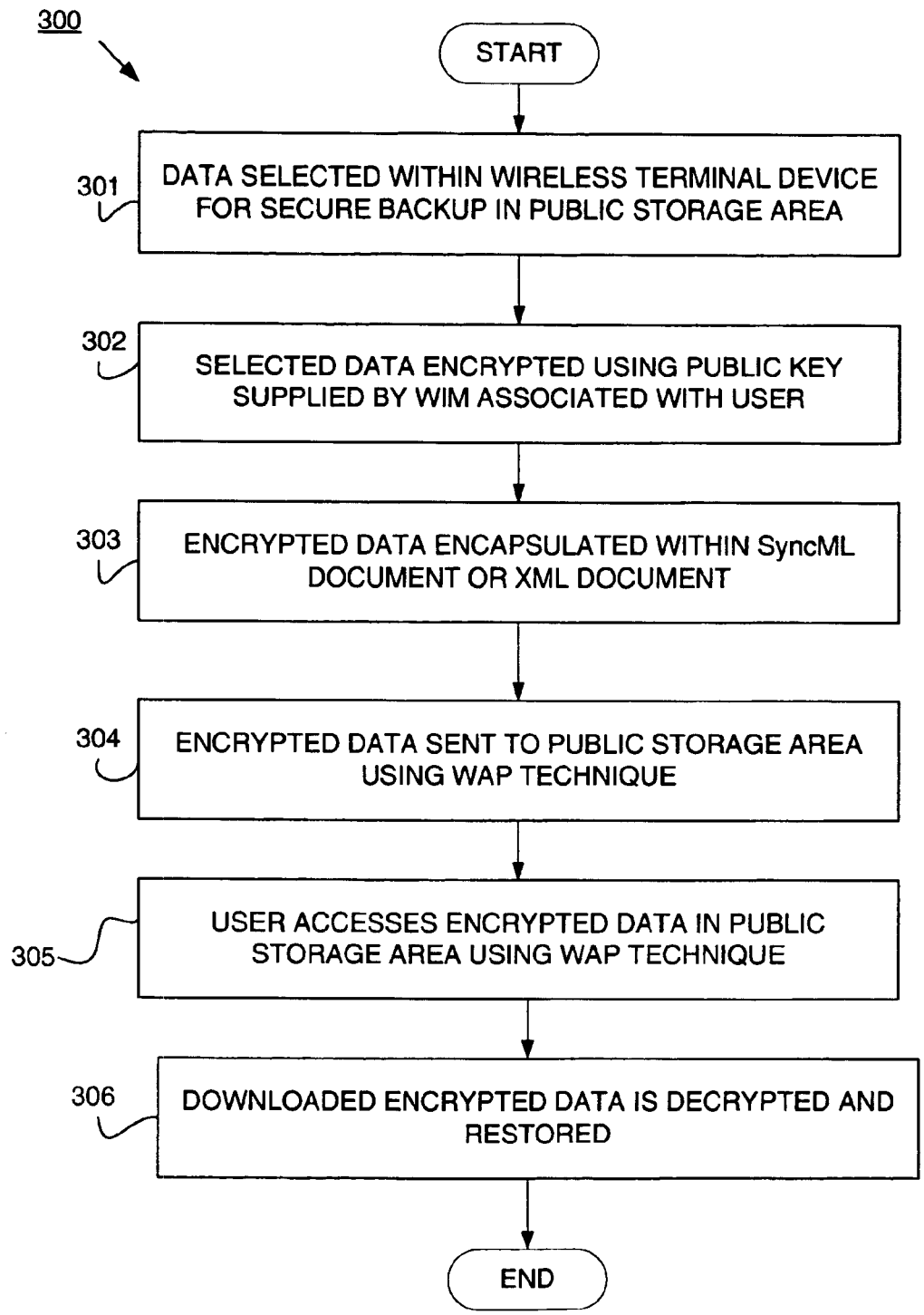
FIG. 3 shows a flow diagram 300 for backing-up data in a wireless network according to the present invention.

FIG. 3 shows a flow diagram 300 for backing-up data in a wireless network according to the present invention. At step 301, a user selects data within a wireless client device for backup in a public storage area that is accessible by the wireless client device through the wireless network. At step 302, the selected data is encrypted using a public key for the user supplied by a WIM associated with the user. At step 303, the encrypted data is preferably encapsulated within a SyncML document or an XML document. At step 304, the encrypted data is sent to the public storage area using a WAP technique. Later, at step 305, the user accesses and downloads the encrypted data in the public storage area using WAP technique. At step 306, the downloaded encrypted data is decrypted using a private key of the user that is supplied by the WIM associated with the user.

While the present invention has been described in connection with the illustrated embodiments, it will be appreciated and understood that modifications may be made without departing from the true spirit and scope of the invention.

What is claimed is:

1. A method for backing-up data in a wireless network, the method comprising steps of:
   selecting data within a wireless device for backup in a storage area, the storage area being accessible by the wireless device through the wireless network;
   encrypting the selected data; and
   sending the encrypted data to the storage area
   wherein the step of sending the encrypted data to the storage area is done using a Wireless Application Protocol (WAP) technique.

2. The method according to claim 1, wherein the step of sending the encrypted data to the storage area includes a step of encapsulating the encrypted data within a SyncML document.

3. The method according to claim 1, wherein the step of sending the encrypted data to the storage area includes a step of encapsulating the encrypted data within an XML document.

4. The method according to claim 1, wherein the wireless device is one of a wireless telephone handset and a personal digital assistant.

5. The method according to claim 1, wherein the step of encrypting the selected data encrypts the selected data using a public key.

6. The method according to claim 5, wherein the public key is supplied by a Wireless Identity Module (WIM).

7. The method according to claim 1, further comprising steps of:
   downloading the encrypted data from the storage area; and
   decrypting the encrypted data.

8. The method according to claim 7, wherein the step of downloading the encrypted data from the storage area is done using a WAP technique.

9. The method according to claim 7, wherein the step of decrypting the encrypted data decrypts the encrypted data using a private key.

10. A method for accessing backed-up data in a wireless network from a wireless device, the method comprising steps of:
    downloading the backed-up data from a storage area, the backed up data having been previously selected for backup by a user of the wireless device, the backed-up data further containing encrypted data encrypted by an encryption module upon the selection of the data, and the storage area being accessible by the wireless device through the wireless network; and
    decrypting the downloaded backed-up data.

11. The method according to claim 10, wherein the step of downloading the backed-up data from the storage area is done using a Wireless Application Protocol (WAP) technique.

12. The method according to claim 10, wherein the step of decrypting the downloaded backed-up data decrypts the encrypted data using a private key.

13. The method according to claim 12, wherein the private key is supplied by a Wireless Identity Module (WIM).

14. The method according to claim 10, wherein the backed-up data is embedded in a SyncML document.

15. The method according to claim 10, wherein the backed-up data is embedded in an XML document.

16. The method according to claim 10, wherein the wireless client device is one of a wireless telephone handset and a personal digital assistant.

17. A wireless terminal device, comprising:
    a memory capable of storing data;
    a browser capable of allowing a user of the wireless terminal device to select data for backup storage;
    a backup module capable of receiving the selected data upon its selection by the browser and encrypting the selected data; and
    a backup application capable of sending the encrypted selected data to a storage area that is accessible to the wireless terminal device through a wireless network.

18. The wireless terminal device according to claim 17, wherein the browser is a Wireless Application Protocol (WAP) browser.

19. The wireless terminal device according to claim 17, wherein the encrypted selected data is sent to the storage area using a Wireless Application Protocol (WAP) technique.

20. The wireless terminal device according to claim 17, wherein the encrypted selected data is encapsulated within a SyncML document.

21. The wireless terminal device according to claim 17, wherein the encrypted selected data is encapsulated within an XML document.

22. The wireless terminal device according to claim 17, wherein the wireless terminal device is one of a wireless telephone handset and a personal digital assistant.

23. The wireless terminal device according to claim 17, wherein the backup module encrypts the selected data using a public key.

24. The wireless terminal device according to claim 23, further comprising a Wireless Identity Module (WIM) that stores the public key.

25. The wireless terminal device according to claim 17, wherein the backup application downloads the encrypted data from the storage area, the wireless terminal device further comprising a restore module that decrypts the encrypted data.

26. The wireless terminal device according to claim 25, wherein the encrypted data is downloaded from the storage area using a Wireless Application Protocol (WAP) technique.

27. The wireless terminal device according to claim 25, wherein the restore module decrypts the encrypted data using a private key.

28. The wireless terminal device according to claim 27, further comprising a Wireless Identity Module (WIM) that stores the private key.

29. A method for backing-up and retrieving data in a wireless network, the method comprising steps of:

detecting user-selected data within a wireless device for backup in a storage area, the storage area being identifiable by a URI and being accessible by the wireless device through the wireless network;

encrypting the selected data encrypted using a public key for the user supplied by a WIM associated with the user;

embedding the encrypted data in a SyncML document;

sending the encrypted data to the storage area using a Wireless Application Protocol (WAP) technique;

accessing the encrypted data in the storage area from the wireless device using a backup application stored in the wireless device;

downloading the backed-up data from the storage area, the backed up data having been previously selected for download by the user of the wireless device;

decrypting the downloaded backed-up data using a private key supplied by the WIM associated with the user.

\* \* \* \* \*